US012790237B2

(12) United States Patent
Wang et al.

(10) Patent No.: US 12,790,237 B2
(45) Date of Patent: Nov. 10, 2026

(54) CAPILLARY DISTILLATION METHOD AND DEVICE

(71) Applicant: GUANGDONG UNIVERSITY OF TECHNOLOGY, Guangdong (CN)

(72) Inventors: Zhangxin Wang, Guangdong (CN); Dejun Feng, Guangdong (CN); Longchao Wang, Guangdong (CN); Shu Yang, Guangdong (CN); Yan Yang, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 187 days.

(21) Appl. No.: 18/593,990

(22) Filed: Mar. 4, 2024

(65) Prior Publication Data

US 2025/0059066 A1 Feb. 20, 2025

(30) Foreign Application Priority Data

Aug. 18, 2023 (CN) ......................... 202311049084.3

(51) Int. Cl.

| | |
|---|---|
| ***C02F 1/04*** | (2023.01) |
| ***B01D 1/00*** | (2006.01) |
| ***B01D 1/30*** | (2006.01) |
| ***B01D 5/00*** | (2006.01) |
| *C02F 103/08* | (2006.01) |

(52) U.S. Cl.

CPC ............ *C02F 1/048* (2013.01); *B01D 1/0011* (2013.01); *B01D 1/30* (2013.01); *B01D 5/006* (2013.01); *C02F 1/043* (2013.01); *C02F 2103/08* (2013.01); *C02F 2201/002* (2013.01)

(58) Field of Classification Search

CPC .. C02F 1/04; C02F 1/048; C02F 1/043; C02F 2201/002; B01D 1/0011; B01D 1/30; B01D 5/006; B01D 1/0064

See application file for complete search history.

(56) References Cited

U.S. PATENT DOCUMENTS

2019/0344193 A1* 11/2019 Chardon .................. B01D 1/22

FOREIGN PATENT DOCUMENTS

| | | | |
|---|---|---|---|
| CN | 110180404 | 8/2019 | |
| WO | WO-2022192383 A1 * | 9/2022 | ................ F26B 9/06 |

* cited by examiner

*Primary Examiner* — Renee Robinson
(74) *Attorney, Agent, or Firm* — JCIPRNET

(57) ABSTRACT

The present invention introduces a capillary distillation method comprising the following steps: heating wastewater, subsequently directing the heated wastewater to one end of a water-diversion fiber material. Through capillary action, the heated wastewater permeates the water-diversion fiber material, diffusing downward along microchannel pathways within the material. Upon reaching the surface of the water-diversion fiber material, the wastewater evaporates. Water vapor is then directed to a condensation module, where it undergoes condensation and collection, resulting in the production of fresh water.

4 Claims, 7 Drawing Sheets

CAPILLARY DISTILLATION METHOD AND DEVICE

CROSS-REFERENCE TO RELATED APPLICATION

This application claims the priority benefit of China application serial no. 202311049084.3, filed on Aug. 18, 2023. The entirety of the above-mentioned patent application is hereby incorporated by reference herein and made a part of this specification.

BACKGROUND

Technical Field

The present invention relates to the technical field of water resource recovery, and in particular to a capillary distillation method and device.

Description of Related Art

Thermal desalination is an important technical means to extract fresh water from high-salinity industrial wastewater or seawater at present. Thermal desalination is essentially a thermal phase change process, in which water is vaporized by heating and then vapor is condensed into a clean fresh water resource, leaving salt in the raw water. Nowadays, commonly used thermal desalination technologies mainly include multi-effect distillation, multi-effect flash evaporation, mechanical vapor compression evaporation, etc. Distillation separation technology has been in use since ancient times due to its outstanding desalination effect, high upper salinity limit in feed, and abilities to treat ultrahigh-salinity wastewater (e.g., reverse osmosis concentrated brine) and produce clean fresh water. However, so far, distillation desalination still relies on coal or other chemical energy sources to provide a large amount of energy needed for heating, and a large number of high-temperature and high-pressure devices are also needed in equipment construction. Moreover, the system has a complex structure and a large occupied area, so the application of the traditional distillation separation technology often requires the investment of a lot of money as well as high time costs for construction and operation.

Membrane distillation, as an emerging thermal desalination technology, utilizes a microporous hydrophobic membrane to separate the feed on the hot side from the distilled water on the cold side. This process operates on the principle of thermal gradient-driven mass transfer. In this mechanism, the heat from the hot feed causes vaporization, and the resulting vapor permeates through the membrane pores to reach the cold distilled water side. Different from the traditional distillation technology, membrane distillation can utilize low-grade heat sources (such as solar energy, geothermal energy, industrial waste heat, etc.), and has the advantages of convenient operation, small occupied area, low investment cost, low secondary pollution, etc. Therefore, membrane distillation has shown great potential in the fields of seawater/brackish water desalination, and high-salinity high-organic wastewater treatment and recycling.

However, ever since membrane distillation was put forward in 1963, it is still difficult to realize commercial application in the world. As the most critical component of membrane distillation, the microporous hydrophobic membrane mainly functions to: I. provide pore channels for mass transfer of water vapor; and II. separate the feed and the distilled water, and reject salt and impurities in water. For example, a patent publication with publication no. CN110180404, entitled "NOVEL DOUBLE-LAYER HOLLOW FIBER MEMBRANE FOR MEMBRANE DISTILLATION, AND PREPARATION METHOD AND APPLICATION THEREOF", discloses a hollow fiber membrane having a hydrophilic layer as an inner layer and a hydrophobic layer as an outer layer. The membrane casting solution of the inner layer includes PVDF, and the membrane casting solution of the outer layer includes P(VDF-co-HFP). However, due to the complexity of feed components, the above-mentioned and conventional hydrophobic membrane materials often encounter problems such as membrane pore wetting, fouling and scaling, which leads to the failure of the membrane distillation process. New hydrophobic membrane materials, due to high preparation cost and complicated production process, still cannot be prepared commercially, which makes the current microporous hydrophobic membranes still limit the industrialization of membrane distillation.

Therefore, it has become an urgent technical problem to provide a distillation method that not only makes full use of the advantages of the membrane distillation technology, but also avoids the problems of wetting, fouling and scaling caused by the use of the microporous hydrophobic membranes.

SUMMARY

In view of the existing technical problems above, a first objective of the present invention is to provide a capillary distillation method. By replacing a hydrophobic membrane material with a water-diversion fiber material, feed wastewater can directly enter the water-diversion fiber material based on capillarity of the material so as to realize a process of water-transfer inside the material and evaporation on the surface of the material, thereby avoiding the problems of wetting, fouling and scaling of the hydrophobic membrane in the membrane distillation process. Furthermore, the capillary distillation method shares several advantages with membrane distillation. It harnesses low-grade heat sources, offering the benefits of easy operation, compact footprint, low investment costs, and minimal secondary pollution. Operable under atmospheric pressure, it can efficiently recover fresh water resources without the need for high-temperature or high-pressure devices.

A second objective of the present invention is to provide a capillary distillation device using the above-mentioned capillary distillation method.

The above objectives of the present invention are realized by the following technical solutions.

A capillary distillation method includes the steps of:

heating wastewater, subsequently contacting the heated wastewater to one end of a water-diversion fiber material such that, by means of capillary action, the heated wastewater enters an inside of the water-diversion fiber material from the end of water-diversion fiber material and gradually diffuse downward along micropore channels in the water-diversion fiber material and toward a surface of the water-diversion fiber material and evaporate after diffusing to the surface of the water-diversion fiber material;

contacting water vapor to a condensation module such that the water vapor is condensed and collected, thereby obtaining distilled water.

The existing membrane distillation technology uses the microporous hydrophobic membrane to separate the feed with different temperatures from fresh water and provide pore channels for mass transfer of water vapor (gaseous water), thus realizing the treatment of high-salinity high-organic wastewater. However, it is difficult for the conventional commercial hydrophobic membrane to resist the damage of contaminants in wastewater, and the novel hydrophobic membrane (i.e., Janus membrane and omniphobic membrane) cannot be prepared commercially, so it is difficult to realize commercial application of membrane distillation in the market. Based on long-term research, the inventors use a water-diversion fiber material as a mass transfer medium to replace the traditional microporous hydrophobic material membrane for the treatment and reuse of high-salinity high-organic wastewater.

Specifically, according to the present invention, the water-diversion fiber material is used as a medium for transporting, carrying and evaporating feed wastewater, the heated feed wastewater diffuses inside the water-diversion fiber material through the capillarity and evaporates on the surface of the material. After the evaporation of heated feed wastewater, water vapor forms fresh water under the action of a condensation module, and the fresh water is recovered into a fresh water storage tank and stored therein. Due to the presence of the water-diversion fiber material in the capillary distillation device, there is no need to provide transport channels for the diffusion of water vapor, or to separate the feed and the distilled water, and the water-diversion fiber material only serves as a carrier for heated feed wastewater and a medium for evaporation. Therefore, during this process, there will be no contamination of fresh water or the reduction in salt rejection rate due to wetting of membrane pores, and the membrane pores will not be blocked due to membrane fouling and scaling. As a result, the present invention successfully addresses challenges encountered in the membrane distillation process, enabling continuous treatment of complex wastewater. It inherits the advantages of membrane distillation while avoiding limitations associated with the use of hydrophobic membranes, thus demonstrating the potential for large-scale commercialization.

Moreover, in accordance with the present invention, capillary distillation is conducted leveraging the unique properties of water-diversion fiber materials. The employed water-diversion fiber material exhibits microporous and hydrophilic characteristics, in direct contrast to the hydrophobic nature of hydrophobic membranes. Therefore, the water-diversion fiber material and the microporous hydrophobic membrane are essentially different during the wastewater treatment process. In terms of the hydrophobic membrane, the feed side is heated, so that water vapor passes through membrane pore and is condensed at the cold side under the driving force of the vapor pressure gradient. Only gaseous substances, such as water vapor, are allowed to pass through the membrane pores. Regarding the water-diversion fiber material, upon direct contact with the incoming feed wastewater, it promptly infiltrates the water-diversion material, traverses its interior, and subsequently diffuses and evaporates on the membrane's surface. Freshwater is then condensed on the surface of the condensation plate, facilitating recovery. Through the substitution of hydrophobic membrane material with water-diversion fiber material as the medium for mass transfer and water vapor evaporation, the present invention mitigates issues such as wetting, fouling, and scaling encountered with hydrophobic membrane materials in the membrane distillation process. Furthermore, utilizing cotton, hemp fiber, and polyvinyl alcohol as primary materials, the preparation method is both mature and cost-effective. The distillation application based on the water-diversion fiber material in the present invention can utilize low-grade heat sources, has the advantages of compact equipment, no secondary pollution and low investment and operating costs, and is more conducive to realizing large-scale industrial application.

Preferably, the water-diversion fiber material is selected from one or more of cotton, hemp fiber and polyvinyl alcohol.

Preferably, the water-diversion fiber material is in one or more forms of a sheet, a bundle, a mesh or a sponge.

Preferably, the water-diversion fiber material is hydrophilic. The water-diversion fiber material has a water contact angle of <90°. Further preferably, the water-diversion fiber material has a water contact angle of 40°-50°.

Preferably, the water-diversion fiber material has water-diversion micropore channels, and the water-diversion micropore channels have an average pore diameter of 0.1 μm-100 μm. Further preferably, the water-diversion micropore channels have an average pore diameter of 1 μm-50 μm. The water-diversion fiber material is a porous material having an irregular micron-sized microporous structure.

Preferably, the wastewater is heated by a heating module to a temperature of 40° C.-90° C. Further preferably, the wastewater is heated by the heating module to a temperature of 60° C.-70° C. More specifically, the wastewater may be heated to a temperature of 40° C., 45° C., 50° C., 55° C., 60° C., 65° C., 70° C., 75° C., 80° C., 85° C. or 90° C., which is not limited thereto in the present application.

Preferably, a temperature of the condensation is lower than the temperature of the heated wastewater. Further preferably, the temperature of the condensation is 0° C.-40° C. More specifically, the temperature of the condensation may be 0° C., 5° C., 10° C., 15° C., 20° C., 25° C., 30° C., 35° C. or 40° C., which is not limited thereto in the present application.

Further, the present invention provides a capillary distillation device using the above method, including:

a heating assembly, including a heating device for heating wastewater feed; and an evaporation assembly, including a diffusion chamber and an evaporation and condensation chamber, wherein the diffusion chamber is communicated with the evaporation and condensation chamber through a water-diversion fiber material, and the evaporation and condensation chamber is communicated with a fresh water collection chamber, the water-diversion fiber material and a condensation module for condensing water vapor are arranged in the evaporation and condensation chamber, an end portion of one end of the water-diversion fiber material is connected with the diffusion chamber and extends into the diffusion chamber, and an end portion of the another end of the water-diversion fiber material is connected with a return pipe, and a gap is provided between the water-diversion fiber material and the condensation module Preferably, the capillary distillation device further includes a wastewater storage tank for storing wastewater to be treated, and the return pipe is connected with the wastewater storage tank.

Preferably, the condensation module is a plate-type condenser. The condensation module may be conventional equipment for condensation in the art. Further, there may be multiple stages of plate-type condensers.

Preferably, a partition is arranged between the diffusion chamber and the evaporation and condensation chamber. The partition is arranged at a bottom of the diffusion chamber and a top of the evaporation and condensation chamber. The partition closes and isolates the diffusion chamber and the evaporation and condensation chamber.

Preferably, the diffusion chamber is communicated with the wastewater storage tank through a thermal-insulation pipe.

Preferably, the fresh water collection chamber is connected with the fresh water storage tank.

Compared with the prior art, the present invention has the following beneficial effects.

By replacing the hydrophobic membrane material with the water-diversion fiber material as the medium for mass transfer of water vapor, the present invention avoids the problems of wetting, fouling and scaling of the membrane material during the membrane distillation process. In addition, according to the present invention, the capillary distillation is performed based on the hydrophilic and microporous characteristics of the water-diversion fiber material, which is essentially different from the vapor-transmission-type membrane distillation based on the hydrophobic membrane, thereby avoiding the problem of contamination of purified water caused by membrane wetting, and the problem of blockage of membrane pores caused by fouling and scaling of the membrane during the traditional membrane distillation process. The present invention has the advantages of compact equipment, no secondary pollution and lower investment and operating costs than the traditional thermal separation technologies such as multi-effect flash evaporation and multi-effect distillation, and is more conducive to realizing large-scale industrial application.

In the figures, 1—wastewater storage tank; 2—feed pump; 3—heating assembly; 4—diffusion chamber; 5—evaporation and condensation chamber; 6—water-diversion fiber material; 7—fresh water collection chamber; 8—fresh water pump; 9—condensation module; 10—fresh water storage tank; 11—thermal-insulation pipe; 12—return pipe.

DESCRIPTION OF THE EMBODIMENTS

The following embodiments are for exemplary illustration only and are not to be construed as a limitation of the present invention. In order to better illustrate the embodiments, some components in the accompanying drawings are omitted, enlarged or reduced, and do not represent the dimensions of the actual product. It can be understood for those skilled in the art that some well-known structures in the accompanying drawings and descriptions thereof may be omitted. The positional relationships described in the accompanying drawings are for exemplary illustration only and are not to be construed as a limitation of the present invention.

When describing the embodiments of the present invention, the orientation or positional relationship indicated by the terms "length", "width", "thickness", "height", "longitudinal", "lateral", "upper", "lower", "front", "back", "left", "right", "vertical", "horizontal", "top", "bottom", "inside", "outside" and the like is based on the orientation or positional relationship shown in the relevant accompanying drawings, and is used only for the convenience of describing the present invention and simplifying the description, rather than to indicate or imply that the device or element referred to must have a specific orientation, or be constructed and operated in a specific orientation, so the above terms cannot be construed as a limitation of the present invention.

Embodiment 1 Capillary Distillation Method and Device

Figure 1:
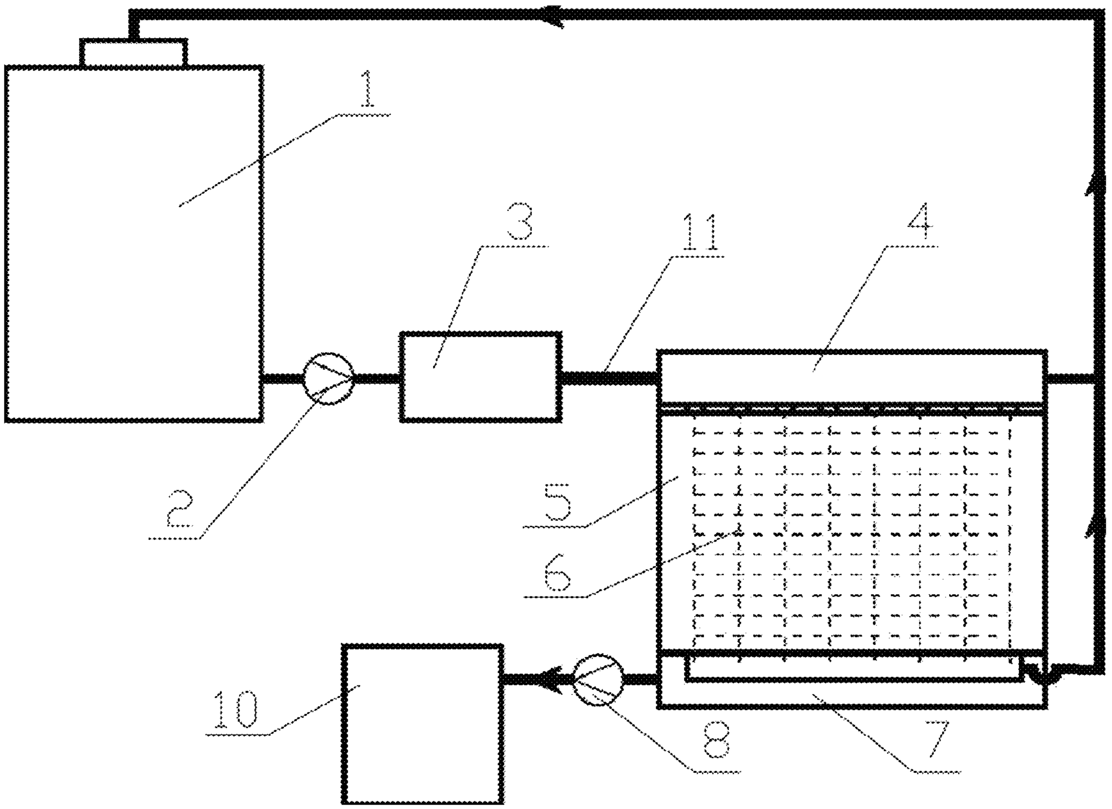
FIG. 1 is a schematic structural diagram of a capillary distillation device.
Figure 2:
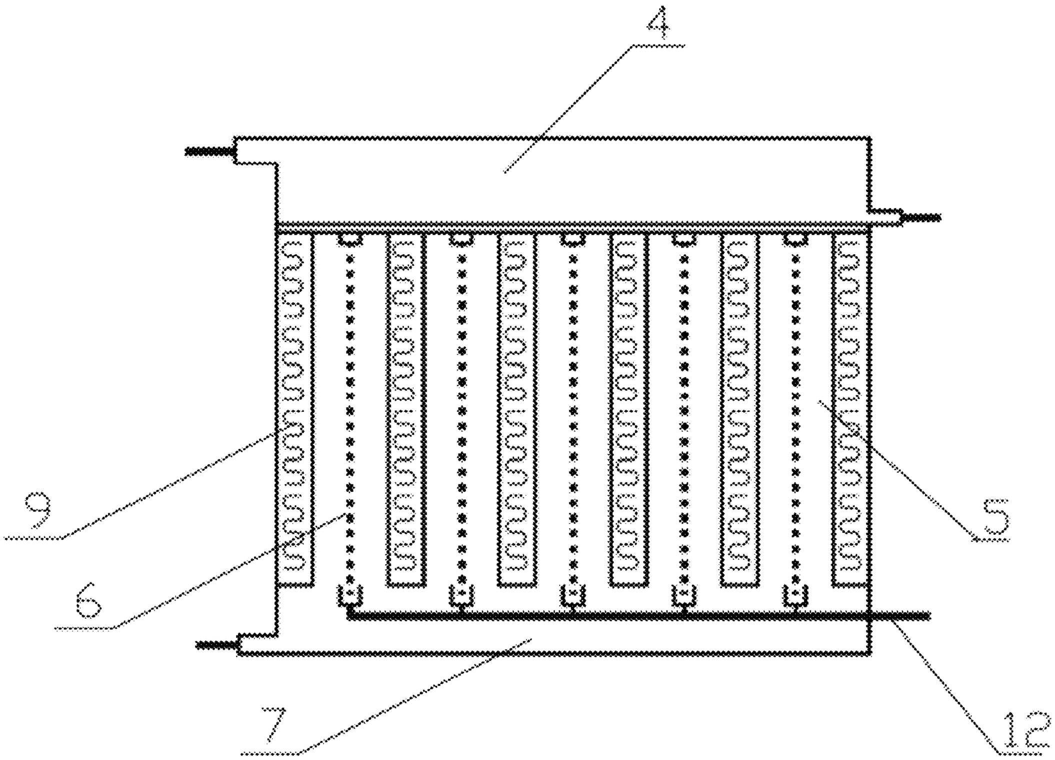
FIG. 2 is a schematic structural diagram of an evaporation assembly and an evaporation and condensation chamber.

As shown in FIG. 1 to FIG. 2, a device using a capillary distillation method includes: a wastewater storage tank 1 for storing wastewater to be treated, a heating assembly 3 and an evaporation assembly. The heating assembly 2 includes a heating device for heating a wastewater feed. The evaporation assembly includes a diffusion chamber 4 and an evaporation and condensation chamber 5. The diffusion chamber 4 is communicated with the evaporation and condensation chamber 5 through a water-diversion fiber material 6. The evaporation and condensation chamber 5 is communicated with a fresh water collection chamber 7. The water-diversion fiber material 6 and a condensation module 9 for condensing water vapor are arranged in the evaporation and condensation chamber 5. An end portion of one end of the water-diversion fiber material 6 is connected with the diffusion chamber 4 and extends into the diffusion chamber 4, and an end portion of another end is connected with the diffusion chamber 4 is connected with a return pipe 12. A gap is provided between the water-diversion fiber material 6 and the condensation module 9.

In this embodiment, the return pipe 12 is connected with the wastewater storage tank 1. The unevaporated wastewater flowing from the water-diversion fiber material 6 returns to the wastewater storage tank 1 through the return pipe 12.

In this embodiment, the condensation module 9 is a plate-type condenser. There may be 6 plate-type condensers.

In this embodiment, a partition is arranged between the diffusion chamber 4 and the evaporation and condensation chamber 5. The partition is arranged at a bottom of the diffusion chamber 4 and a top of the evaporation and condensation chamber 5. The partition closes and isolates the diffusion chamber 4 and the evaporation and condensation chamber 5, so that the wastewater in the diffusion chamber 4 can enter the evaporation and condensation chamber 5 only through the water-diversion fiber material 6.

In this embodiment, the diffusion chamber 4 is communicated with the wastewater storage tank 1 through a thermal-insulation pipe 11.

In this embodiment, a feed pump 2 is further arranged between the wastewater storage tank and the heating assembly. A fresh water pump 8 is further arranged between a fresh water storage tank 10 and the fresh water collection chamber 7.

Further, this embodiment further provides a capillary distillation method, including the following steps: heating wastewater, subsequently contacting the heated wastewater to one end of a water-diversion fiber material such that, by means of capillary action, the heated wastewater enters an inside of the water-diversion fiber material from the end of water-diversion fiber material and gradually diffuse downward along micropore channels in the water-diversion fiber material and toward a surface of the water-diversion fiber material and evaporate after diffusing to the surface of the water-diversion fiber material; the water vapor being condensed and collected, thereby obtaining distilled water.

Figure 3:
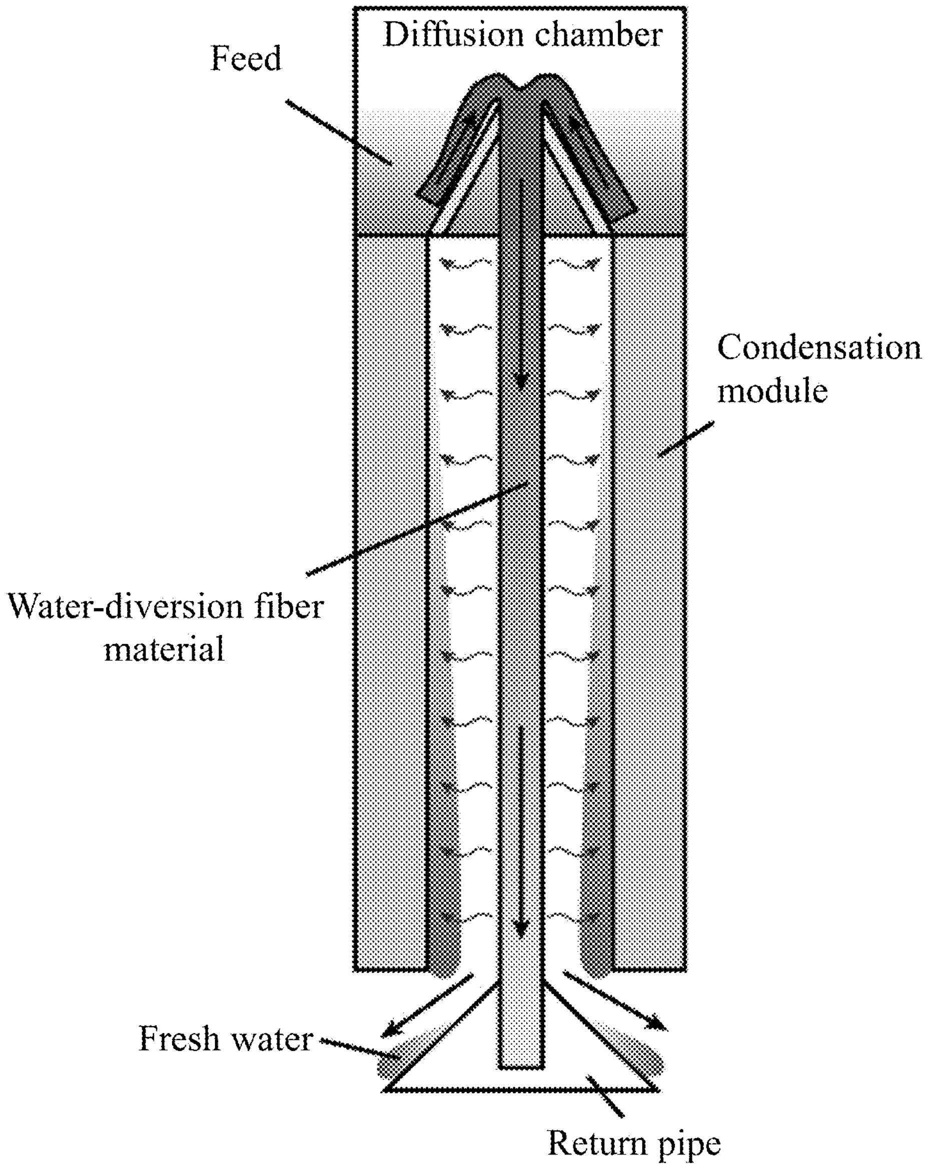
FIG. 3 a schematic diagram of the principle of capillary distillation.

Further, FIG. 3 shows a schematic diagram of the principle of capillary distillation. As shown in FIG. 3, the principle of the capillary distillation method is as follows. Wastewater in the wastewater storage tank is heated by the heating device (to 60° C.) and then enters the diffusion chamber through the thermal-insulation pipe, and the heated wastewater entering the diffusion chamber contacts the end portion of one end of the water-diversion fiber material and enters the inside of the water-diversion fiber material from this end through capillarity. The heated wastewater gradually diffuses downward along the micropore channels in the water-diversion fiber material and toward the surface of the water-diversion fiber material and then evaporates in the evaporation and condensation chamber after diffusing to the surface of the water-diversion fiber material. Water vapor after evaporation of the heated wastewater contacts the condensation module (20° C.) such that the water vapor is condensed. Subsequently, the condensate water slides down along the condensation module into the fresh water collection chamber, and then enters the fresh water storage tank for storage.

In this embodiment, the water-diversion fiber material is a polyvinyl alcohol sheet material (provided by Hunan Kerun Membrane Industry Co., Ltd.).

Figure 11:
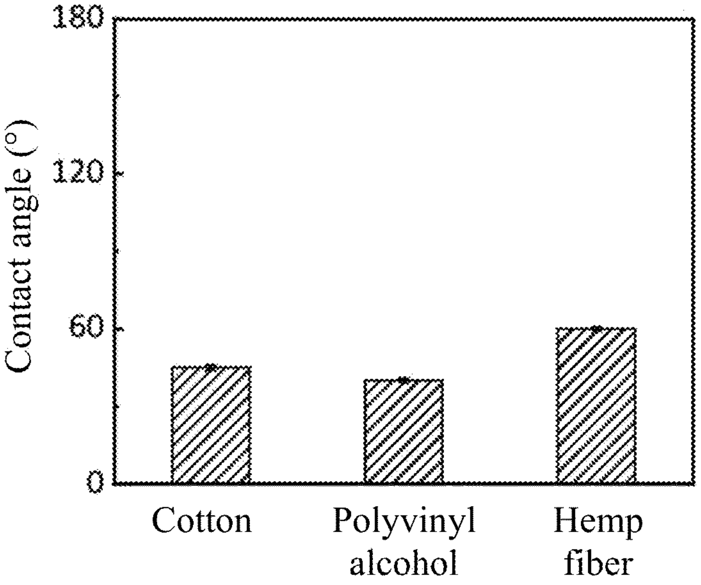
FIG. 11 shows contact angles of cotton, hemp fiber and polyvinyl alcohol materials.

In this embodiment, the water-diversion fiber material is hydrophilic, and specifically has a contact angle of 40.25±0.53° (as shown in FIG. 11) and micron-sized micropore channels (specifically 1 μm).

Limited by the necessity of using microporous hydrophobic materials, the existing membrane distillation technology will inevitably have the problems of membrane wetting, membrane contamination and membrane fouling, making it still at the stage of research and development in the laboratory application and not suitable for commercial application in the market. The microporous hydrophobic membrane, serving as a mass transfer medium for water vapor, provides mass transfer channels for water vapor, and various small molecule substances and impurities contained in the wastewater will contaminate the membrane pores, causing wetting or blockage, thereby greatly affecting the efficiency of membrane distillation. Through long-term research, the inventors use the water-diversion fiber material as the mass transfer medium to replace the traditional hydrophobic fiber material membrane for distillation treatment of wastewater. According to the present invention, the water-diversion fiber material is used as a medium for transporting, carrying and evaporating feed wastewater; the wastewater diffuses inside the water-diversion fiber material after entering the diffusion chamber through the capillarity and then evaporates on the surface of the material; water vapor after evaporation of the heated wastewater forms fresh water under the action of the condensation module, and the fresh water is recovered into the fresh water storage tank and stored therein. By replacing the hydrophobic membrane material with the water-diversion fiber material as the medium for mass transfer and evaporation of water vapor, the present invention avoids the problems of wetting, fouling and scaling of the hydrophobic membrane material during the membrane distillation process, and moreover, by using cotton, hemp fiber and polyvinyl alcohol as the main material, the preparation method is mature and has low cost. The distillation based on the water-diversion fiber material in the present invention can utilize low-grade heat sources, has the advantages of compact equipment, no secondary pollution and low investment and operating costs, and is more conducive to realizing large-scale industrial application.

Embodiment 2 Capillary Distillation Method and Device

This Embodiment is different from Embodiment 1 in that: the water-diversion fiber material used in this embodiment is a cotton fiber sheet (provided by Hunan Kerun Membrane Industry Co., Ltd.) having a contact angle of 45.28±0.98° and an average pore diameter of 50 μm.

Embodiment 3

The capillary distillation method and device in Embodiment 1 are used to treat wastewater from a factory. The factory wastewater has a salinity of 30000 mg/L, a total organic carbon (mainly engine oil) of 1000 mg/L, a pH of 7 and a temperature of 25° C.

The specific treatment process is as follows.

(1) The factory wastewater is introduced into an oil removal tank such that oil on the surface is removed. The oil-removed wastewater feed enters the wastewater storage tank, and is heated by the heating device to 60° C., and then, the heated wastewater feed is slowly lifted into the diffusion chamber by the feed pump.

(2) After entering the diffusion chamber, the heated wastewater feed contacts the end portion of one end of polyvinyl alcohol fiber sheet in the diffusion chamber. Through capillarity, the heated wastewater enters the polyvinyl alcohol fiber sheet and uniformly diffuses from top to bottom. The wastewater transported to the polyvinyl alcohol fiber sheet evaporates on the surface of the polyvinyl alcohol fiber sheet. Water vapor diffuses to the air gap between the fiber sheet and the condensation module. The water vapor after evaporation of the heated wastewater diffusing into the air gap contacts the condensation module (20° C.) and condenses into fresh water. The fresh water slides down from the condensation module under the action of gravity into the bottom of the evaporation and condensation chamber. Then, the fresh water is drawn by the fresh water pump to the fresh water storage tank for recycling.

(3) The unevaporated fresh water in the fiber sheet enters the return pipe, and then enters the wastewater storage tank through the return pipe for repeated evaporation. Step (1) and step (2) are repeated until the salinity of the wastewater in the wastewater storage tank reaches 200000 mg/L.

Figure 4:
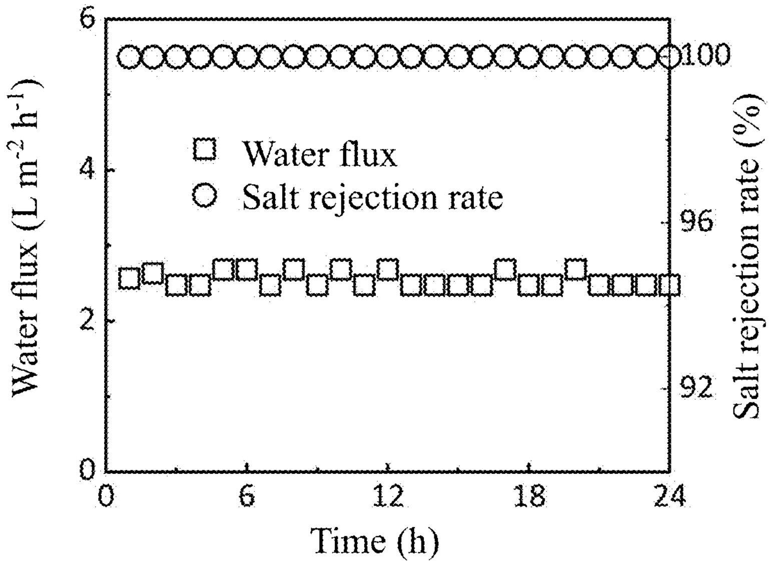
FIG. 4 is a data diagram of a water flux and a salt rejection rate in the treatment process of embodiment 3.

FIG. 4 is a data diagram of a water flux and a salt rejection rate in the treatment process of Embodiment 3. According to the results in FIG. 4, the initial flux of the capillary distillation is 2.565 L/($m^2$·h); and after the capillary distillation continuously runs at a stable and high flux for 24 h, the salt rejection rate is up to 99.99%, and the finally produced water has a total organic carbon (TOC) of 0.28 mg/L and a measured salinity of 4.62 mg/L, which meets the criteria for distilled water.

Embodiment 4

The capillary distillation method and device in Embodiment 1 are used to treat wastewater from a factory. The factory wastewater has a salinity of 35000 mg/L, a surfactant content (mainly sodium lauryl sulfate) of 30 mg/L, a pH of 7 and a temperature of 25° C.

The specific treatment process is as follows.

(1) The factory wastewater is introduced into a cartridge filter such that suspended solid impurities in the wastewater are removed. Then, the wastewater feed enters the wastewater storage tank, and is heated by the heating device to 60° C., and then, the heated wastewater feed is slowly lifted into the diffusion chamber by the feed pump.

(2) After entering the diffusion chamber, the heated wastewater feed contacts the end portion of one end of polyvinyl alcohol fiber sheet in the diffusion chamber. Through capillarity, the heated wastewater enters the polyvinyl alcohol fiber sheet and uniformly diffuses from top to bottom. The wastewater transported to the polyvinyl alcohol fiber sheet evaporates on the surface of the polyvinyl alcohol fiber sheet. Water vapor after evaporation of the heated wastewater diffuses to the air gap between the fiber sheet and the condensation module. The water vapor diffusing into the air gap contacts the condensation module (20° C.) and condenses into fresh water. The fresh water slides down from the condensation module under the action of gravity into the bottom of the evaporation and condensation chamber. Then, the fresh water is drawn by the fresh water pump to the fresh water storage tank for recycling.

(3) The unevaporated fresh water in the fiber sheet enters the return pipe, and then enters the wastewater storage tank through the return pipe for repeated evaporation. Step (1) and step (2) are repeated until the salinity of the wastewater in the wastewater storage tank reaches 150000 mg/L.

Figure 5:
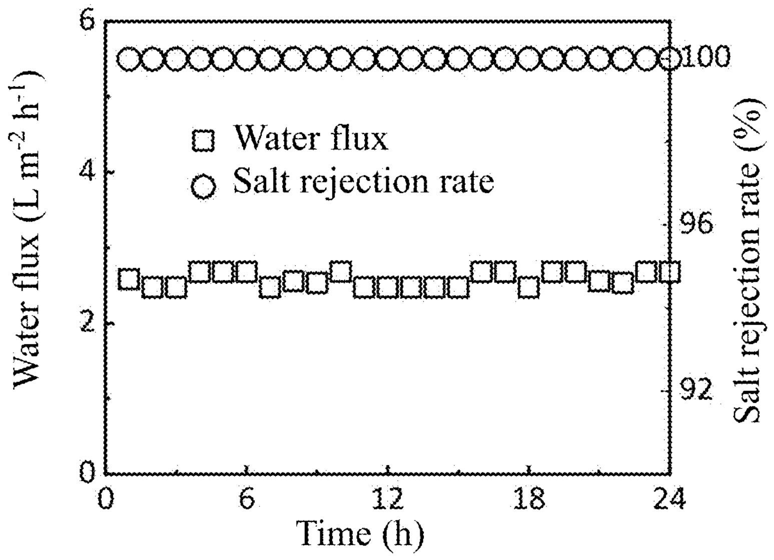
FIG. 5 is a data diagram of a water flux and a salt rejection rate in the treatment process of embodiment 4.

FIG. 5 is a data diagram of a water flux and a salt rejection rate in the treatment process of Embodiment 4. According to the results in FIG. 5, the initial flux of the capillary distillation is 2.632 L/($m^2$·h); and after the capillary distillation continuously runs at a stable flux for 24 h, the salt rejection rate is up to 99.99%, and the finally produced water has a measured salinity of 4.16 mg/L, which meets the criteria for distilled water.

Embodiment 5

The capillary distillation method and device in Embodiment 1 are used to treat wastewater from a factory. The factory wastewater has a salinity of 35000 mg/L, a $Ca^{2+}$ and $SO_4^{2-}$ content of 30 mmol/L, a pH of 7 and a temperature of 25° C.

The specific treatment process is as follows.

(1) The factory wastewater is introduced into a cartridge filter such that suspended solid impurities in the wastewater are removed. The oil-removed wastewater feed enters the wastewater storage tank, and is heated by the heating device to 60° C., and then, the heated wastewater feed is slowly lifted into the diffusion chamber by the feed pump.

(2) After entering the diffusion chamber, the heated wastewater feed contacts the end portion of one end of polyvinyl alcohol fiber sheet in the diffusion chamber. Through capillarity, the heated wastewater enters the polyvinyl alcohol fiber sheet and uniformly diffuses from top to bottom. The wastewater transported to the polyvinyl alcohol fiber sheet evaporates on the surface of the polyvinyl alcohol fiber sheet. Water vapor after evaporation of the heated wastewater diffuses to the air gap between the fiber sheet and the condensation module. The water vapor diffusing into the air gap contacts the condensation module (20° C.) and condenses into fresh water. The fresh water slides down from the condensation module under the action of gravity into the bottom of the evaporation and condensation chamber. Then, the fresh water is drawn by the fresh water pump to the fresh water storage tank for recycling.

(3) The unevaporated fresh water in the polyvinyl alcohol fiber sheet enters the return pipe, and then enters the wastewater storage tank through the return pipe for repeated evaporation. Step (1) and step (2) are repeated until the salinity of the wastewater in the wastewater storage tank reaches 150000 mg/L.

Figure 6:
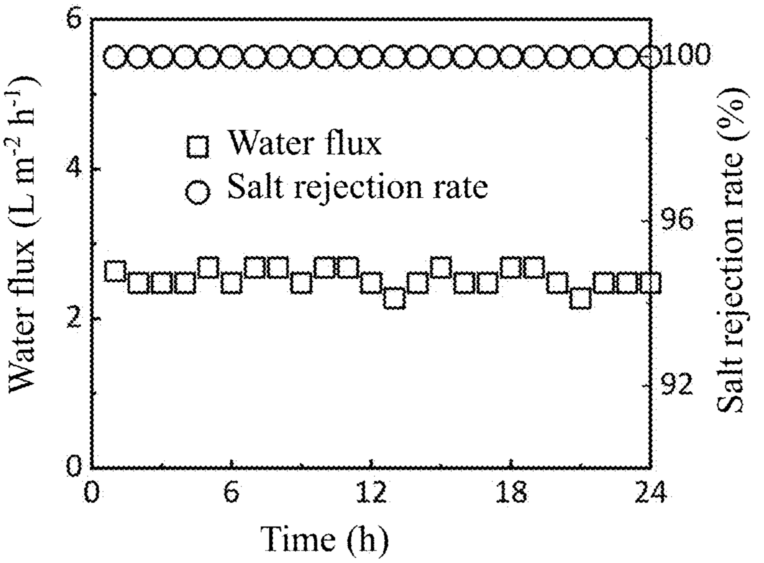
FIG. 6 is a data diagram of a water flux and a salt rejection rate in the treatment process of embodiment 5.

FIG. 6 is a data diagram of a water flux and a salt rejection rate in the treatment process of Embodiment 5. According to the results in FIG. 6, the initial flux of the capillary distillation is 2.582 L/($m^2$·h); and after the capillary distillation continuously runs at a stable flux for 24 h, the salt rejection rate is up to 99.99%, and the finally produced water has a measured salinity of 3.76 mg/L.

Comparative Example 1

Figure 7:
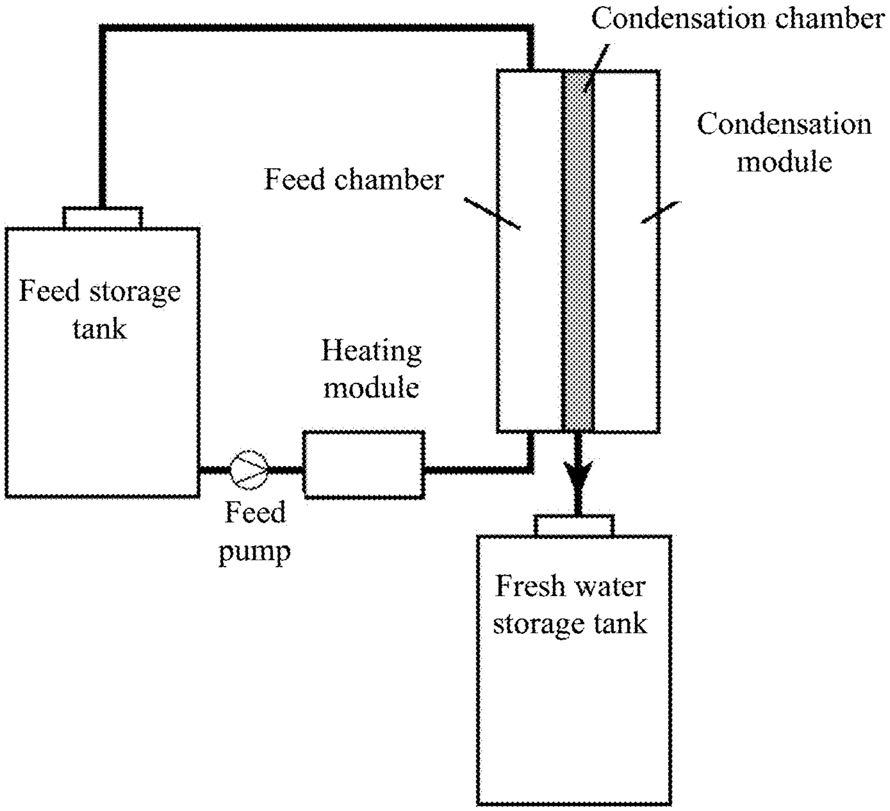
FIG. 7 is a schematic structural diagram of an air-gap membrane distillation device in Comparative Examples 1 to 3.

An air-gap membrane distillation device, as shown in FIG. 7, is used to treat the same production wastewater as in Embodiment 3. The factory wastewater has a salinity of 30000 mg/L, a total organic carbon (TOC) of 1000 mg/L, a pH of 7 and a temperature of 25° C. In this process, a polyvinylidene fluoride hydrophobic membrane having a pore diameter of 0.45 μm is used.

The specific treatment process is as follows.

(1) The factory wastewater is introduced into an oil removal tank such that oil on the surface is removed. The oil-removed wastewater feed enters a feed storage tank, and is heated by a heating device to 60° C., and then, the heated wastewater feed is slowly lifted into a feed chamber by a feed pump.

(2) In the feed chamber, the wastewater feed directly contacts the polyvinylidene fluoride hydrophobic membrane, and under the driving force of the vapor partial pressure difference between both sides of the membrane, the water vapor passes through membrane pores and enters a condensation chamber. Under the action of a condensation module (20° C.), clean condensate fresh water is formed, enters into the fresh water storage tank and is collected.

(3) In the feed chamber, the feed after evaporation and concentration returns to the feed storage tank. If the flux decreases significantly or the salt rejection rate increases significantly, the operation is stopped.

Figure 8:
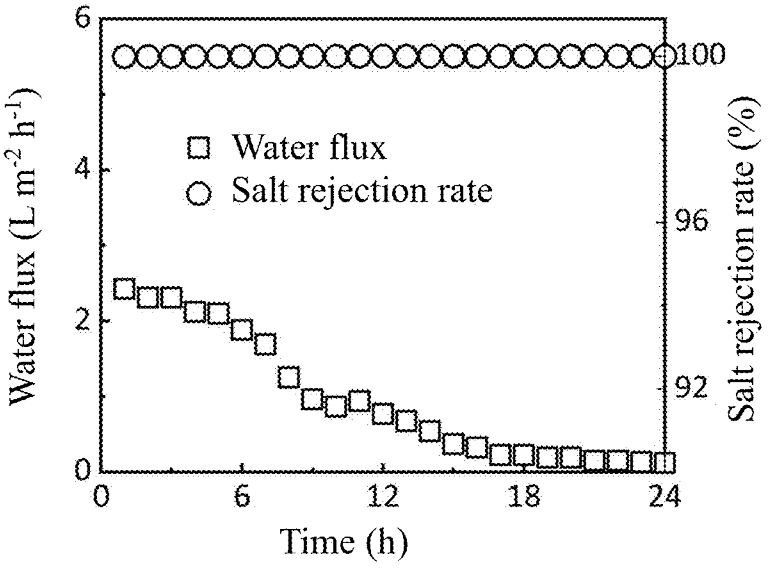
FIG. 8 is a data diagram of a water flux and a salt rejection rate in the treatment process of Comparative Example 1.

FIG. 8 is a data diagram of a water flux and a salt rejection rate in the treatment process of Comparative Example 1. According to the results in FIG. 8, the flux of the membrane distillation continuously decreases from 2.633 L/($m^2$·h) to 0.325 L/($m^2$·h) during the operation process, with a flux loss rate of up to 87%. This indicates severe contamination on the surface of the membrane, so that the efficiency of the treatment process drops sharply and tends to 0 L/($m^2$·h), which eventually leads to the failure of the membrane distillation.

Comparative Example 2

The air-gap membrane distillation device in Comparative Example 1 is used to treat the same factory wastewater as in Embodiment 4. The factory wastewater has a salinity of 35000 mg/L, a surfactant content (mainly sodium lauryl sulfate) of 30 mg/L, a pH of 7 and a temperature of 25° C. In this process, a polyvinylidene fluoride hydrophobic membrane having a pore diameter of 0.45 μm is used.

The specific treatment process is as follows.

(1) The factory wastewater is introduced into a cartridge filter such that suspended solid impurities in the wastewater are removed. Then, the wastewater feed enters the wastewater storage tank, and is heated by the heating device to 60° C., and then, the heated wastewater feed is slowly lifted into the feed chamber by the feed pump.

(2) In the feed chamber, the wastewater feed directly contacts the polyvinylidene fluoride hydrophobic membrane, and under the driving force of the vapor partial pressure difference between both sides of the membrane, the water vapor passes through membrane pores and enters the condensation chamber. Under the action of the condensation module (20° C.), clean condensate fresh water is formed and, enters into the fresh water storage tank and is collected.

(3) In the feed chamber, the feed after evaporation and concentration returns to the feed storage tank. If the flux decreases significantly or the salt rejection rate increases significantly, the operation is stopped.

Figure 9:
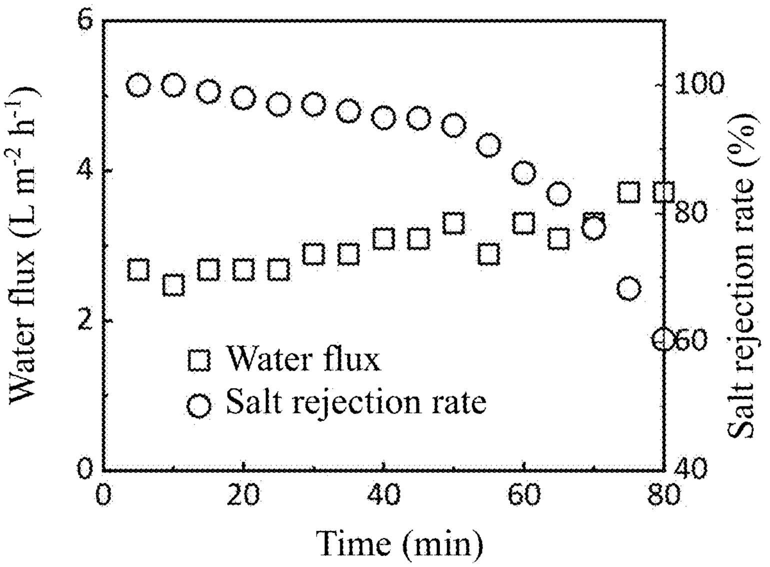
FIG. 9 is a data diagram of a water flux and a salt rejection rate in the treatment process of Comparative Example 2.

FIG. 9 is a data diagram of a water flux and a salt rejection rate in the treatment process of Comparative Example 2. According to the results in FIG. 9, the initial flux of the membrane distillation is 2.533 L/($m^2$·h); and only after 80 min of operation, the flux continuously increases to 3.712 L/($m^2$·h), and the salt rejection rate decreases from 99.99% to 60.42%, which indicates severe wetting of the hydrophobic membrane. The feed directly permeates to the fresh water side through the hydrophobic membrane (water at the non-feed side evaporates), causing the contamination of the fresh water. The results show that the membrane distillation fails because the hydrophobic membrane is wetted.

Comparative Example 3

The air-gap membrane distillation device in Comparative Example 1 is used to treat the same factory wastewater as in Embodiment 5. The wastewater has a salinity of 35000 mg/L, a $Ca^{2+}$ and $SO_4^{2-}$ content of 30 mmol/L, a pH of 7 and a temperature of 25° C. The polyvinylidene fluoride hydrophobic membrane has a pore diameter of 0.45 μm.

The specific treatment process is as follows.

(1) The factory wastewater is introduced into a cartridge filter such that suspended solid impurities in the wastewater are removed. Then, the wastewater feed enters the wastewater storage tank, and is heated by the heating device to 60° C., and then, the heated wastewater feed is slowly lifted into the feed chamber by the feed pump.

(2) In the feed chamber, the wastewater feed directly contacts the polyvinylidene fluoride hydrophobic membrane, and under the driving force of the vapor partial pressure difference between both sides of the membrane, the water vapor passes through membrane pores and enters the condensation chamber. Under the action of the condensation module (20° C.), clean condensate fresh water is formed, enters into the fresh water storage tank and is collected.

(3) In the feed chamber, the feed after evaporation and concentration returns to the feed storage tank. If the flux decreases significantly or the salt rejection rate increases significantly, the operation is stopped.

Figure 10:
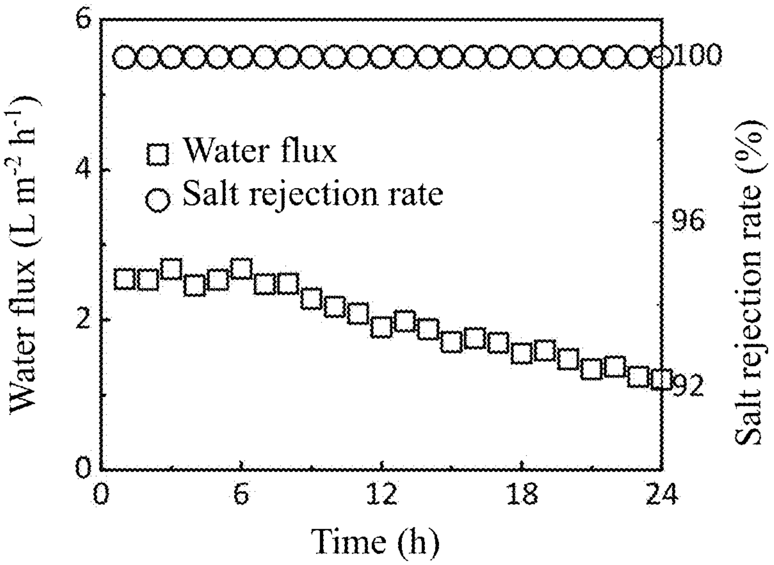
FIG. 10 is a data diagram of a water flux and a salt rejection rate in the treatment process of Comparative Example 3.

FIG. 10 is a data diagram of a water flux and a salt rejection rate in the treatment process of Comparative Example 3. According to the results in FIG. 10, the initial flux of the membrane distillation is 2.544 L/($m^2$·h); and due to the strong concentration polarization effect on the surface of the membrane, the fouling on the surface of the membrane gradually accumulates, so that the flux drops to 1.202 L/($m^2$·h).

Finally, it should be noted that the above embodiments are only used to illustrate the technical solutions of the present invention and are not intended to limit the protection scope of the present invention. A person of ordinary skill in the art can make other variations or changes in different forms on the basis of the above description and idea, and it is unnecessary and impossible to exhaust all the embodiments here. Any modification, equivalent substitution, or improvement made within the spirit and principle of the present invention shall fall into the protection scope of the claims of the present invention.

What is claimed is:

1. A capillary distillation method, comprising following steps of:

heating wastewater, subsequently contacting the heated wastewater to one end of a water-diversion fiber material, which has water-diversion micropore channels, such that, by means of capillary action, the heated wastewater enters an inside of the water-diversion fiber material from the one end of the water-diversion fiber material and diffuses downward along the water-diversion micropore channels in the water-diversion fiber material and toward a surface of the water-diversion fiber material and evaporates after diffusing to the surface of the water-diversion fiber material;

contacting water vapor to a condensation module such that the water vapor is condensed and collected, thereby obtaining distilled water, wherein the water-diversion micropore channels have an average pore diameter of 0.1 μm-100 μm, wherein the water-diversion fiber material is selected from one or more of cotton, hemp fiber and polyvinyl alcohol.

2. The capillary distillation method according to claim 1, wherein the water-diversion fiber material is in one or more forms of a sheet, a bundle, a mesh or a sponge.

3. The capillary distillation method according to claim 1, wherein the water-diversion fiber material has a water contact angle of <90°.

4. The capillary distillation method according to claim 1, wherein the wastewater is heated by a heating module to a temperature of 40° C.-90° C.

* * * * *